US011879476B2

(12) United States Patent
Okada

(10) Patent No.: US 11,879,476 B2
(45) Date of Patent: Jan. 23, 2024

(54) CLOSED IMPELLER AND METHOD FOR PRODUCING CLOSED IMPELLER

(71) Applicant: DAIKIN INDUSTRIES, LTD., Osaka (JP)

(72) Inventor: Tadashi Okada, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/981,062

(22) Filed: Nov. 4, 2022

(65) Prior Publication Data

US 2023/0058821 A1 Feb. 23, 2023

Related U.S. Application Data

(63) Continuation of application No. PCT/JP2021/007762, filed on Mar. 1, 2021.

(30) Foreign Application Priority Data

May 8, 2020 (JP) ................................ 2020-082754

(51) Int. Cl.
*F04D 29/30* (2006.01)
*F04D 29/02* (2006.01)
(Continued)

(52) U.S. Cl.
CPC .......... *F04D 29/30* (2013.01); *F04D 29/023* (2013.01); *F04D 29/2222* (2013.01); *F04D 29/326* (2013.01); *F05D 2230/237* (2013.01)

(58) Field of Classification Search
CPC .. F04D 29/2222; F04D 29/326; F04D 29/023; F05D 2230/237
See application file for complete search history.

(56) References Cited

U.S. PATENT DOCUMENTS 5,964,398 A * 10/1999 Kohno ................ B23K 20/023 228/56.3
6,419,450 B1 * 7/2002 Lum .................. F04D 29/2222 416/186 A (Continued)

FOREIGN PATENT DOCUMENTS

CN 102817869 A 12/2012
JP 48-90008 11/1973

(Continued)

OTHER PUBLICATIONS

International Preliminary Report of corresponding PCT Application No. PCT/JP2021/007762 dated Nov. 17, 2022.

(Continued)

*Primary Examiner* — Topaz L. Elliott
*Assistant Examiner* — Michael K. Reitz
(74) *Attorney, Agent, or Firm* — Global IP Counselors, LLP

(57) ABSTRACT

A closed impeller includes an impeller body including a plurality of blade portions, and a shroud fitted on the impeller body. The shroud is press formed into a curved shape along end portions of the blade portions. The shroud includes a plurality of protrusions protruding from a surface facing the impeller body and extending, and curved, along the end portions of the plurality of blade portions. An amount of protrusion of each of the protrusions is less than a thickness of the shroud. A brazing material is provided at least on end portions of the protrusions.

4 Claims, 8 Drawing Sheets

(51) Int. Cl.
*F04D 29/22* (2006.01)
*F04D 29/32* (2006.01)

(56) References Cited

U.S. PATENT DOCUMENTS

| | | | | |
|---|---|---|---|---|
| 2010/0189568 | A1* | 7/2010 | Watanabe | B23K 1/0018 29/889 |
| 2011/0200439 | A1* | 8/2011 | Nakaniwa | F04D 29/023 416/189 |
| 2015/0044048 | A1* | 2/2015 | Ahn | B22F 5/10 29/889.7 |
| 2021/0048037 | A1* | 2/2021 | Siefring | F04D 29/284 |

FOREIGN PATENT DOCUMENTS

| | | | |
|---|---|---|---|
| JP | 2010-121612 | A | 6/2010 |
| JP | 2010-174652 | A | 8/2010 |
| JP | 2015-48708 | A | 3/2015 |
| KR | 10-2015-0011237 | A | 1/2015 |

OTHER PUBLICATIONS

International Search Report of corresponding PCT Application No. PCT/JP2021/007762 dated Apr. 27, 2021.

Notice of Reasons for Refusal of corresponding JP Application No. 2020-082754 dated Apr. 20, 2021.

Notice of Reasons for Refusal of corresponding JP Application No. 2020-082754 dated Jul. 27, 2021.

* cited by examiner

CLOSED IMPELLER AND METHOD FOR PRODUCING CLOSED IMPELLER

CROSS-REFERENCE TO RELATED APPLICATIONS

This is a continuation of International Application No. PCT/JP2021/007762 filed on Mar. 1, 2021, which claims priority to Japanese Patent Application No. 2020-082754, filed on May 8, 2020. The entire disclosures of these applications are incorporated by reference herein.

BACKGROUND

Technical Field

The present disclosure relates to a closed impeller and a method for producing a closed impeller.

Background Art

Japanese Unexamined Patent Publication No. 2010-174652 discloses a method for producing an impeller, in which a disc and blades are cut out as an integral part from a raw material, and a shroud (cover) and the blades are joined together with a brazing material.

SUMMARY

A first aspect of the present disclose is directed to a closed impeller including an impeller body including a plurality of blade portions, and a shroud fitted on the impeller body. The shroud is press formed into a curved shape along end portions of the blade portions. The shroud includes a plurality of protrusions protruding from a surface facing the impeller body and extending, and curved, along the end portions of the plurality of blade portions. An amount of protrusion of each of the protrusions is less than a thickness of the shroud. A brazing material is provided at least on end portions of the protrusions.

DETAILED DESCRIPTION OF EMBODIMENT(S)

First Embodiment

A first embodiment will be described.

Figure 1:
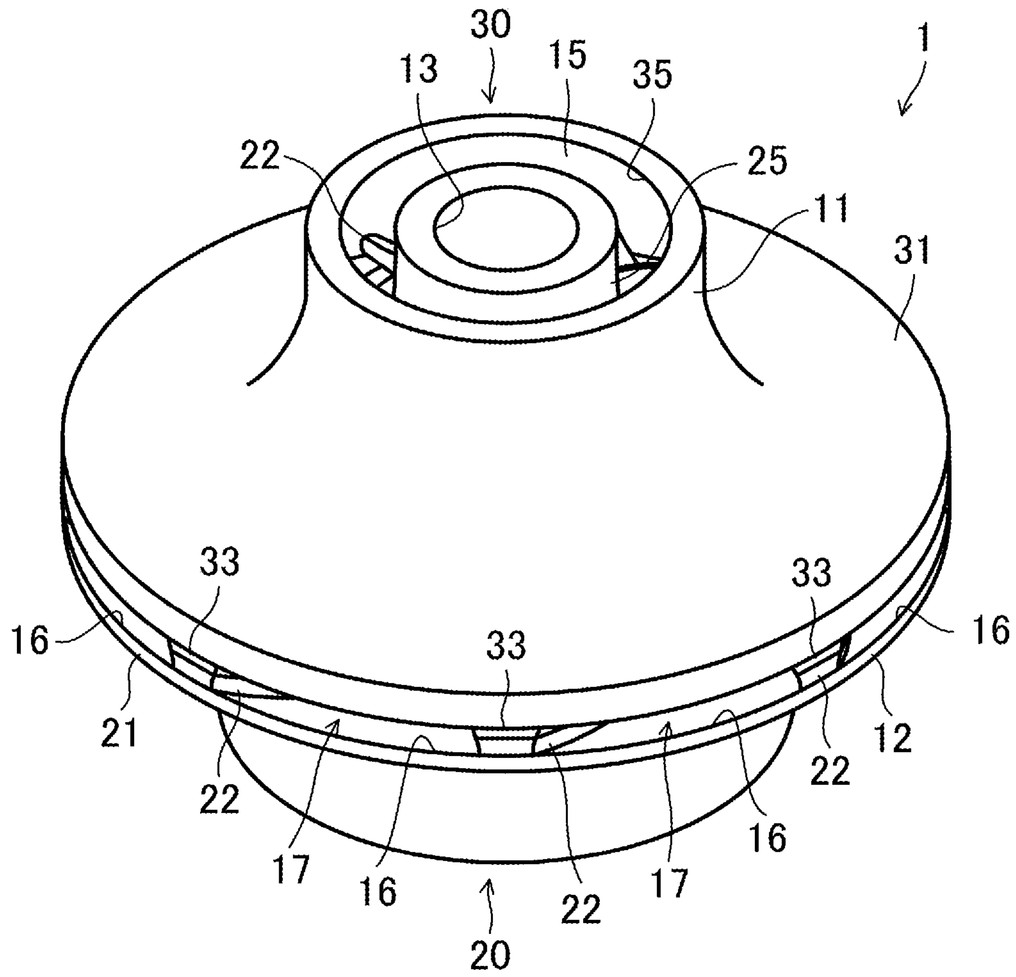
FIG. 1 is a perspective view of a configuration of a closed impeller according to a first embodiment.

As illustrated in FIG. 1, a closed impeller (1) has a substantially circular truncated cone-shape. The closed impeller (1) has a center portion (11) having a smallest outer diameter and an outer circumferential portion (12) having a largest outer diameter. The closed impeller (1) has a through hole (13) at a rotation center thereof.

The through hole (13) of the closed impeller (1) is for insertion of a shaft of a centrifugal compressor (not illustrated). The shaft of the centrifugal compressor is connected to a driving device such as a motor, and a driving force of the driving device is transmitted to the closed impeller (1) via the shaft. The closed impeller (1) rotates in this manner. The center portion (11) has an inlet (15). The inlet (15) opens in an axial direction of the closed impeller (1). The outer circumferential portion (12) has outlets (16). The outlets (16) are open outwardly in the radial direction of the closed impeller (1). The closed impeller (1) has an internal channel (17) formed inside of the closed impeller (1) and connecting the inlet (15) to the outlets (16).

The inlet (15) of the closed impeller (1) is an opening surrounded by an upstream edge portion (25) of a hub portion (21), described later, blade portions (22), and a shroud (30).

Each outlet (16) of the closed impeller (1) is an opening surrounded by a downstream edge portion (27) of the hub portion (21), described later, the blade portions (22), and the shroud (30).

The internal channel (17) of the closed impeller (1) is a space surrounded by a curving portion (26) (see FIG. 2) of the hub portion (21), described later, the blade portions (22), and the shroud (30).

The closed impeller (1) is rotated in a centrifugal compressor, thereby sucking a fluid through the inlet (15). The fluid thus sucked through the inlet (15) flows through the internal channel (17) and is guided to the outlets (16) while being accelerated due to the rotation of the closed impeller (1). The fluid discharged from the outlets (16) is compressed in a diffuser of the centrifugal compressor.

Figure 2:
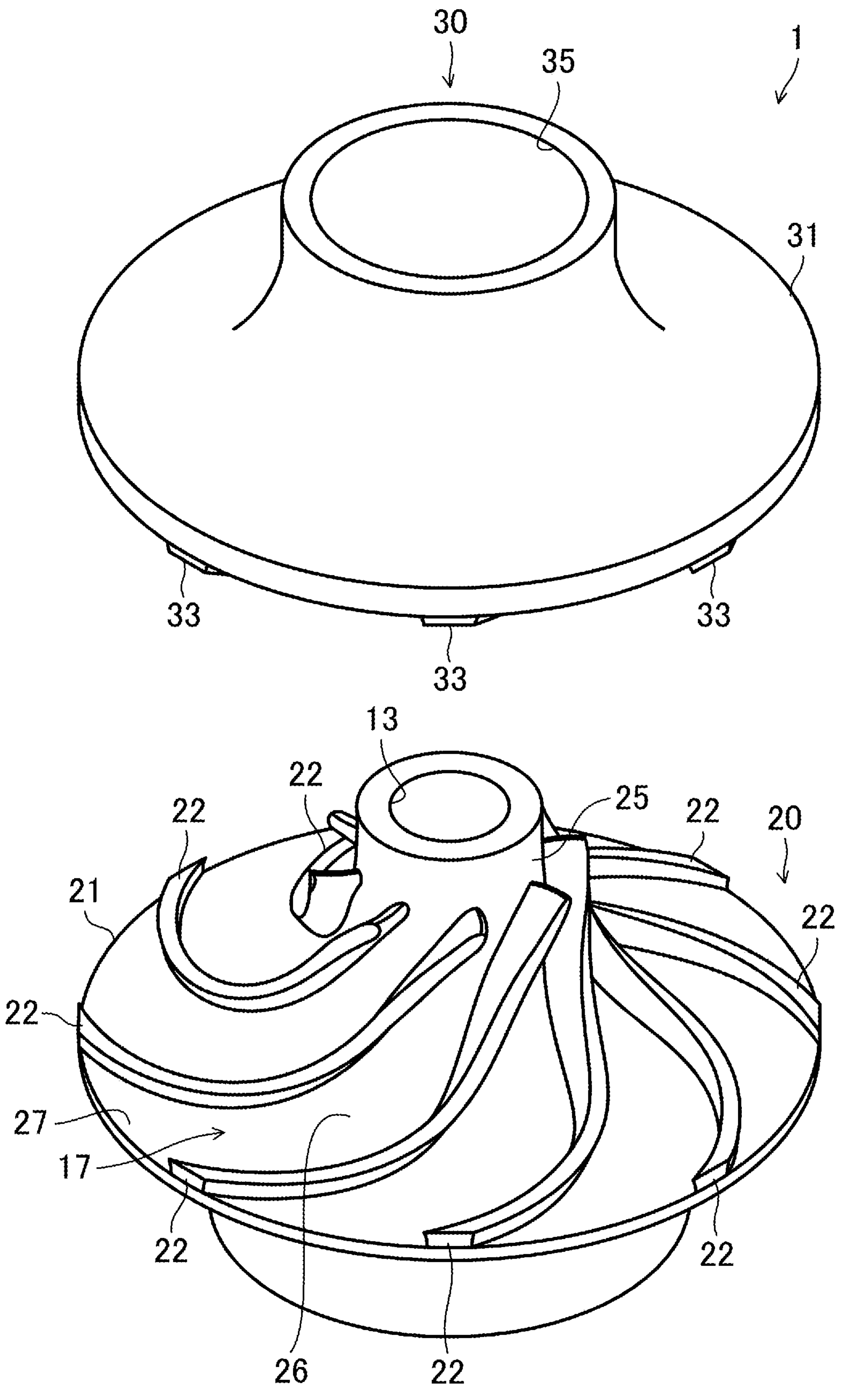
FIG. 2 is an exploded perspective view of the closed impeller.

As illustrated in FIG. 2, the closed impeller (1) includes an impeller body (20) and the shroud (30). The shroud (30) covers the blade portions (22) of the impeller body (20).

The impeller body (20) is made of an aluminum alloy. The impeller body (20) includes the hub portion (21) and a plurality of blade portions (22). The hub portion (21) and the blade portions (22) are formed as an integral part by machining of a block made of the aluminum alloy.

The hub portion (21) has a substantially circular truncated cone-shape. The hub portion (21) has the upstream edge portion (25), the downstream edge portion (27), and the curving portion (26). The upstream edge portion (25) is the edge portion where the inlet (15) is formed. The downstream edge portion (27) is the edge portion where the outlets (16) are formed.

The curving portion (26) connects the upstream edge portion (25) and the downstream edge portion (27). The curving portion (26) is curved such that a contour of the curving portion (26) in a cross section including the rotation center of the closed impeller (1) is recessed inwardly. The circumferential dimension of the curving portion (26) increases gradually from the upstream edge portion (25) to the downstream edge portion (27).

The hub portion (21) has the through hole (13) penetrating the hub portion (21) in the axial direction. The through hole (13) is open at a center portion of the upstream edge portion (25) and a center portion of the downstream edge portion (27).

The impeller body (20) includes the plurality of blade portions (22). The blade portions (22) project from the curving portion (26) toward the shroud (30). The blade portions (22) are helically arranged in plan view as viewed from the inlet (15). The blade portions (22) extend from the upstream edge portion (25) to the downstream edge portion (27) of the hub portion (21). Each of the blade portions (22) has an end portion that is curved along an end portion of a protrusion (33) of the shroud (30) described later.

The shroud (30) is made of a brazing sheet. The shroud (30) includes a core material (31) and a brazing material (32) layered on a one-sided surface of the core material (31) (see FIG. 5).

The shroud (30) is formed into a funnel-like shape by press forming the brazing sheet. The shroud (30) is placed so as to cover the end portions of the blade portions (22). The shroud (30) has a center opening (35) at its center. The upstream edge portion (25) of the hub portion (21) is arranged in the center opening (35) (see FIG. 1).

Figure 3:
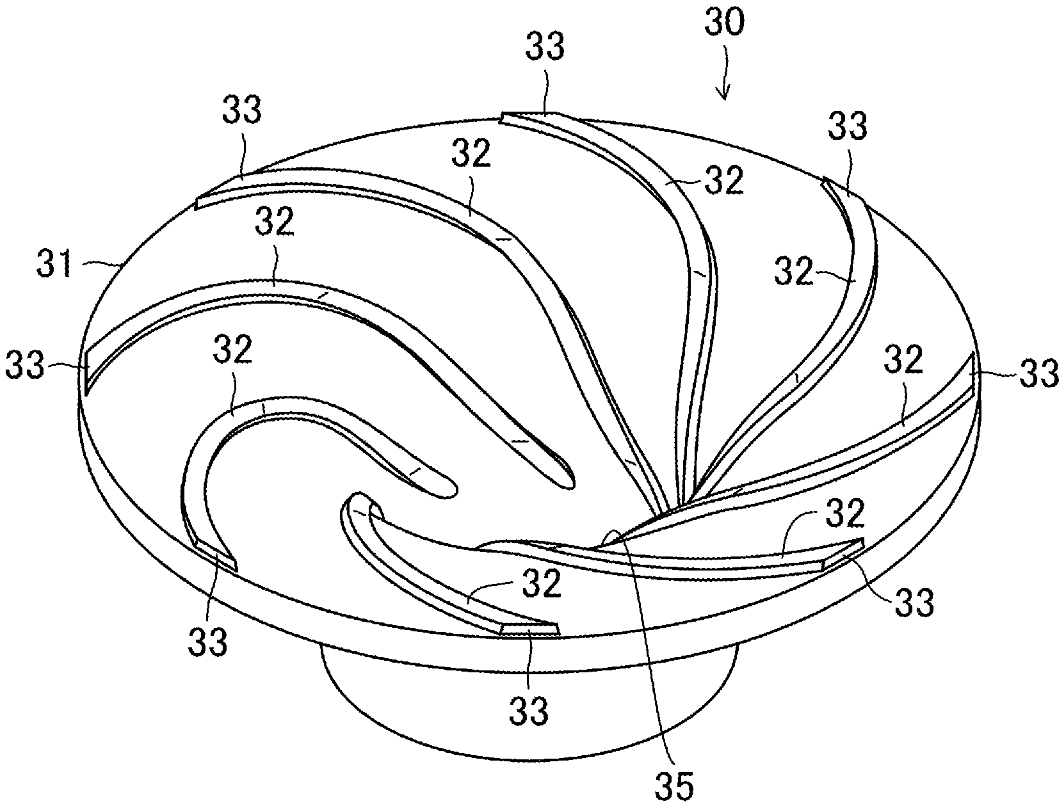
FIG. 3 is a perspective view of a shroud, as viewed from a surface facing an impeller body.

As illustrated in FIG. 3, the shroud (30) has the plurality of protrusions (33). The plurality of protrusions (33) extend helically along the blade portions (22) of the impeller body (20). The protrusions (33) has end portions where the brazing material (32) is provided. The shroud (30) has no brazing material (32) on a surface facing the impeller body (20), except on the protrusions (33).

Figure 4:
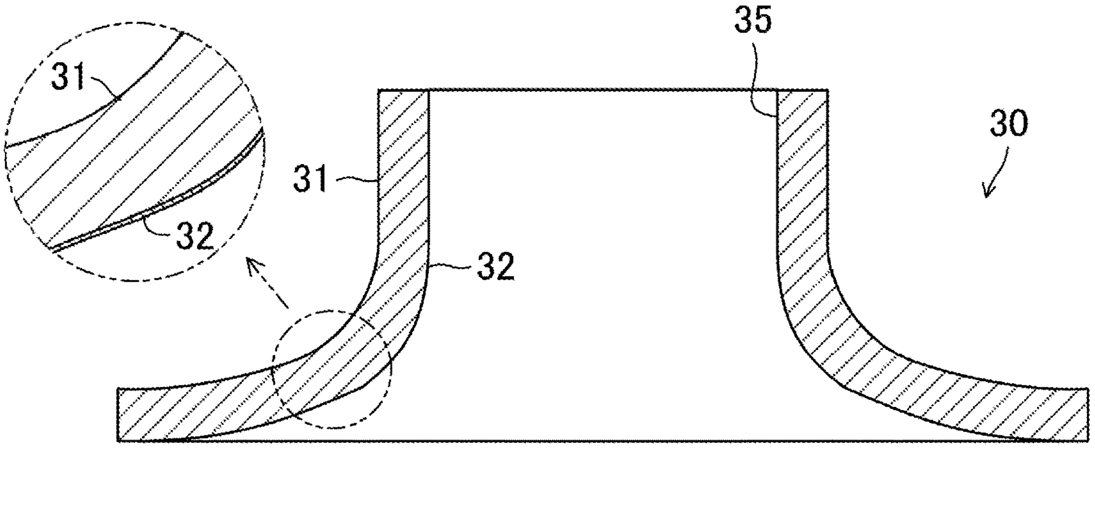
FIG. 4 is a sectional side view of a configuration of the shroud before machining.

Specifically, as illustrated in FIG. 4, the shroud (30) is formed into a funnel-like shape by press forming a brazing sheet having the brazing material (32) on the one-sided surface. Here, the brazing material (32) is provided all over the inner surface of the shroud (30).

Figure 5:
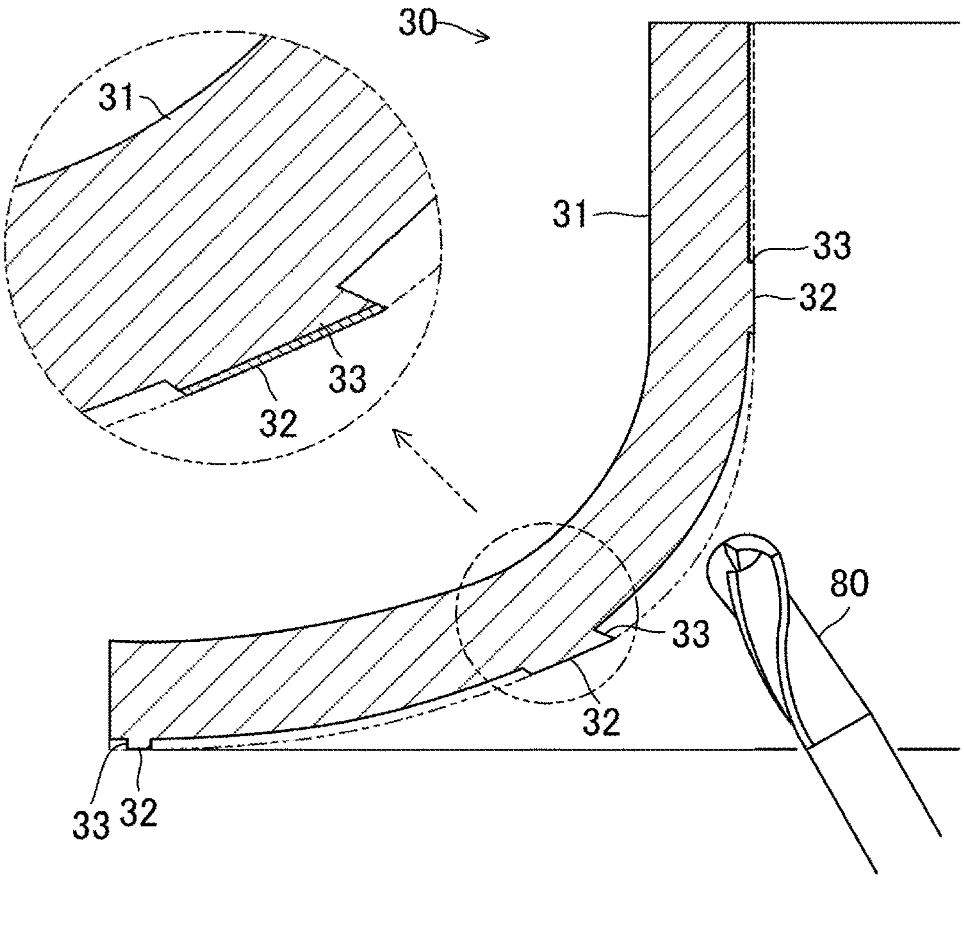
FIG. 5 is a sectional side view of a configuration of the shroud after machining.

As illustrated in FIG. 5, the inner surface of the shroud (30) is partially removed by cutting with a ball end mill (80), so that the plurality of protrusions (33) protrude relatively. As a result, the brazing material (32) remains on the end portions of the protrusions (33), whereas the brazing material (32) on the other portions is removed.

The shroud (30) and the impeller body (20) are joined together by thermally melting the brazing material (32), with the protrusions (33) of the shroud (30) and the blade portions (22) of the impeller body (20) fitted together.

The brazing sheet forming the shroud (30) includes the brazing material (32) having a thickness of about 100 μm to about 150 μm. The brazing material (32) at the portions not used for the joining the impeller body (20) and the shroud (30) may be totally removed from the portions, or the brazing material (32) in the vicinities of the protrusions (33), which are joint portions, may be left by cutting about 20 μm to about 80 μm with the ball end mill (80).

Method for Producing Closed Impeller

The closed impeller (1) may be produced by the following method, for example. The impeller body (20) and the shroud (30) are prepared separately.

The shroud (30) is formed by press forming the brazing sheet including the core material (31) and the brazing material (32). For example, the brazing sheet includes the core material (31) made of an aluminum alloy containing Mg by 0.20 mass % or more and less than 1.80 mass %, and the brazing material (32) made of an Al—Si based alloy and having a thickness of from 100 μm to 150 μm.

In producing the shroud (30) from the brazing sheet, the press forming may be performed so that the brazing material (32) of the brazing sheet be positioned on the inner side of the closed impeller (1), i.e., on the side facing the blade portions (22).

Next, the plurality of protrusions (33) is formed on the surface of the shroud (30) facing impeller body (20). Specifically, as illustrated in FIG. 5, the inner surface of the shroud (30) is partially removed by cutting with a ball end mill (80), so that the plurality of protrusions (33) protrude relatively. The brazing material (32) remains on the end portions of the protrusions (33), whereas the brazing material (32) on the other portions is removed.

The impeller body (20) is obtainable by, for example, machining a block of the aluminum alloy and forming the hub portion (21) and the blade portions (22) as an integral part.

Here, the end portions of the blade portions (22) of the impeller body (20) are machined into a shape corresponding to the shape of the end portions of the protrusions (33) in the shroud (30). Specifically, the shape of the end portions of the blade portions (22) of the impeller body (20) is formed using data obtained in advance through measurement of the shape of the press-formed shroud (30) by a 3D coordinate measuring machine or the like. The shroud (30) may be set on a processing machine and data obtained through measurement of the shape of the shroud (30) may be used in machining the impeller body (20).

The shroud (30) may be machined as appropriate such that the thickness of the brazing material (32) of the shroud (30) is reduced to the extent that there still remains the brazing material (32), thereby reducing a gap between the shroud (30) and the end portions of the blade portions (22) of the impeller body (20). For example, about 20 μm to about 80 μm of the brazing material (32) may be cut off because the brazing material (32) has a thickness of about 100 μm to about 150 μm.

The brazing material (32) has a thickness that is greater in an outer circumferential portion of the shroud (30) than in a center portion of the shroud (30). For example, the thickness of the brazing material (32) is 100 μm in the outer circumferential portion of the shroud (30) and 50 μm in the center portion of the shroud (30).

Figure 6:
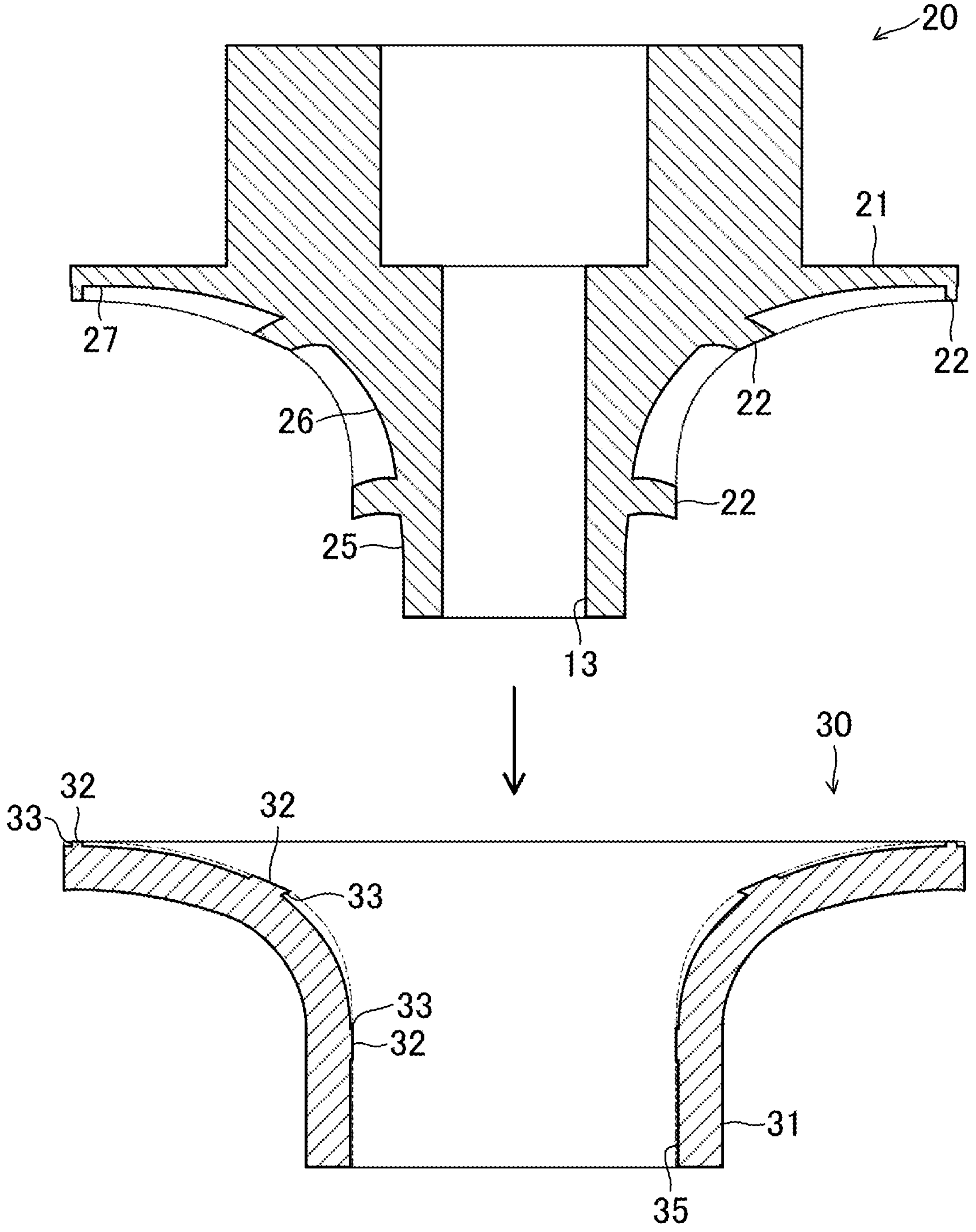
FIG. 6 is a sectional side view of configurations of the shroud and the impeller body.

As illustrated in FIG. 6, the shroud (30) thus prepared is held with the center portion of the shroud (30) facing downward. Then, the blade portions (22) of the impeller body (20) are fitted on the protrusions (33) of the shroud (30). Here, the end portions of the blade portions (22) of the impeller body (20) are brought into contact with the brazing material (32) on the end portions of the protrusions (33) of the shroud (30).

After that, the impeller body (20) and the shroud (30) are heated in an inert gas so as to melt the brazing material (32), thereby brazing the impeller body (20) and the shroud (30).

Figure 7:
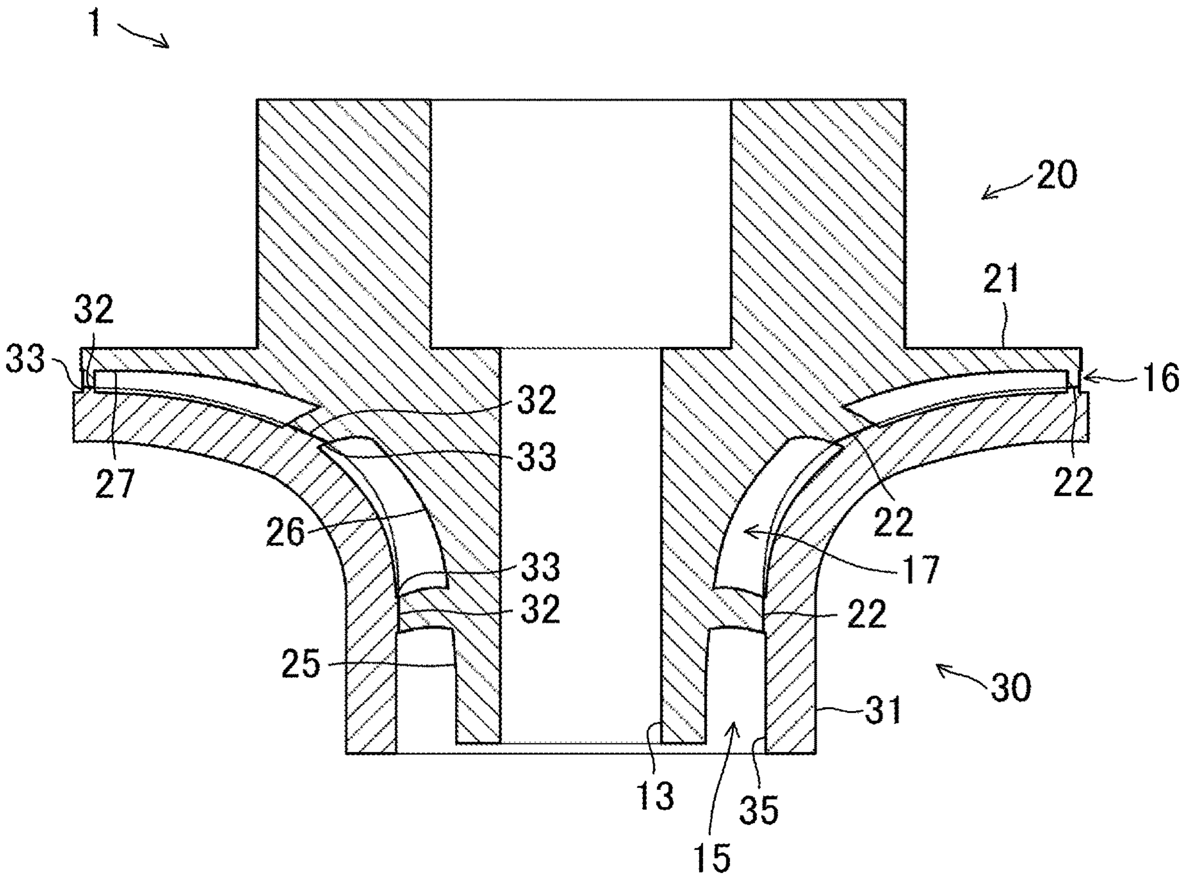
FIG. 7 is a sectional side view of a configuration of the closed impeller after brazing.

As illustrated in FIG. 7, the blade portions (22) of the impeller body (20) and the shroud (30) are joined together via the brazing material (32). The closing impeller (1) is produced in this manner.

As described above, the use of the shroud (30) formed from the brazing sheet makes it possible to perform the brazing without using a binder or flux, which has been employed in known dip brazing.

Advantages of First Embodiment

In this embodiment, the plurality of protrusions (33) is provided on a surface of the press-formed shroud (30) facing the impeller body (20). The protrusions (33) extend along the blade portions (22) and are joined to the corresponding blade portions (22) via the brazing material (32).

This configuration enables brazing between the press-formed shroud (30) and the impeller body (20) fitted together, with a small assembly gap therebetween. Moreover, the thickness of the brazing material (32) after the brazing is thin, thereby increasing joining strength.

In this embodiment, the shroud (30) has no brazing material (32) on the surface facing the impeller body (20), except the end portions of the protrusions (33).

Since the brazing material (32) is removed in advance from the portions not used for the joining the impeller body (20) and the shroud (30), dripping of the brazing material (32) can be reduced.

In this embodiment, the shape of the end portions of the blade portions (22) corresponds to the shape of the end portions of the protrusions (33). This configuration enables brazing with a small gap between the blade portions (22) and the protrusions (33).

In this embodiment, the impeller body (20) is machined, and the shroud (30) is press formed. A surface of the shroud (30) facing the impeller body (20) is partially removed by cutting to form a plurality of protrusions (33). The protrusions (33) and the blade portions (22) are brazed while fitted together.

This configuration enables brazing between the press-formed shroud (30) and the impeller body (20) fitted together, with a small assembly gap therebetween.

In this embodiment, the brazing material (32) has a thickness that is greater in the outer circumferential portion of the shroud (30) than in the center portion of the shroud (30). In the brazing, the shroud (30) is held with its center portion facing downward.

Thus, in the brazing, it is possible to ensure enough amount of the brazing material (32) between the protrusions (33) and the blade portions (22) in the outer circumferential portion, and increase the joining strength, even if a portion of the brazing material (32) liquefied in the outer circumferential portion of the shroud (30) flows toward the center portion.

Second Embodiment

A second embodiment will be described. In the following description, the same reference characters designate the same components as those of the first embodiment, and the description is focused only on the difference.

Figure 8:
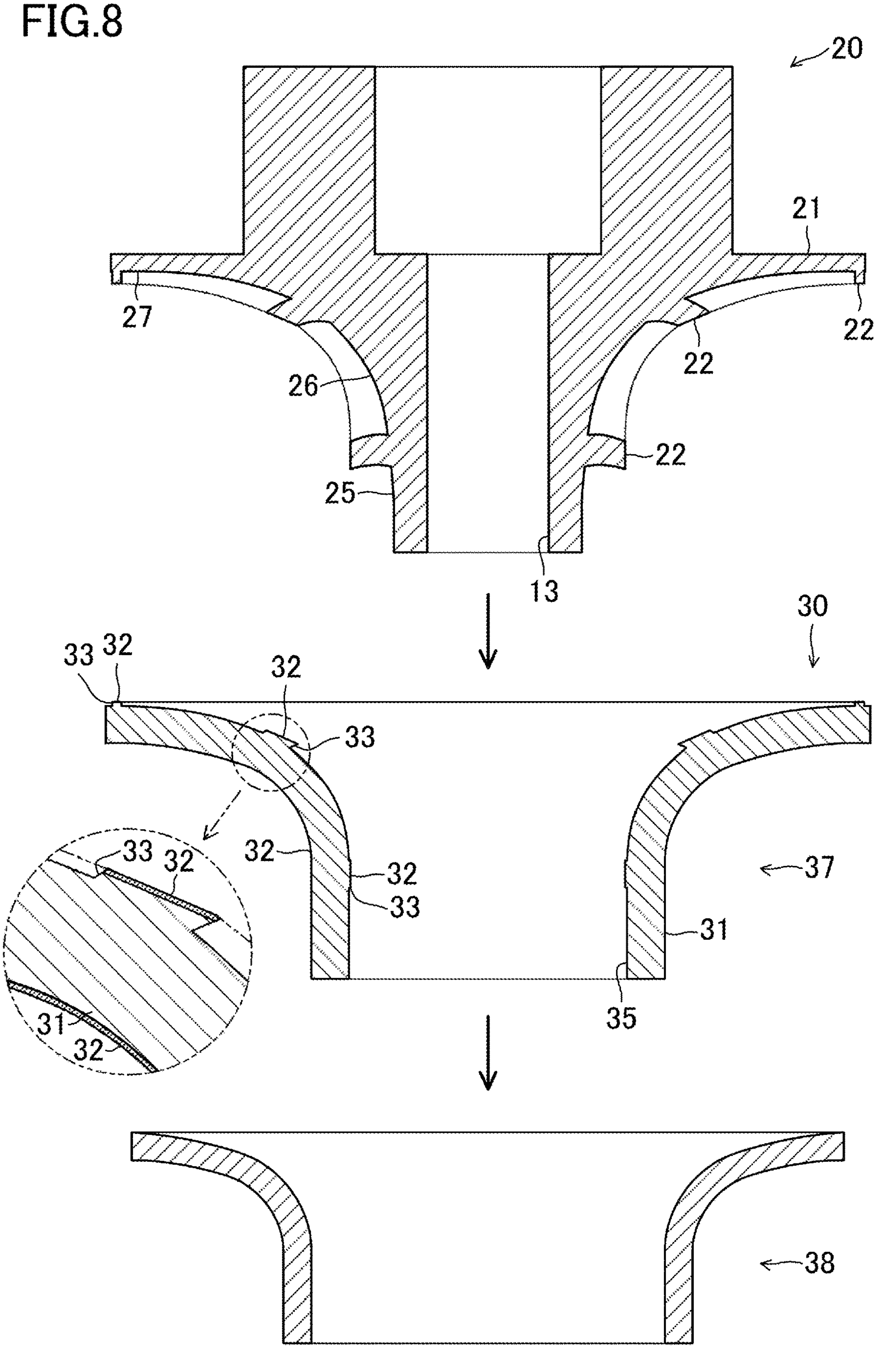
FIG. 8 is a sectional side view of configurations of a first member, a second member, and an impeller body of a closed impeller according to a second embodiment.

As illustrated in FIG. 8, the closed impeller (1) includes an impeller body (20) and a shroud (30). The impeller body (20) includes the hub portion (21) and a plurality of blade portions (22).

The shroud (30) has a first member (37) and a second member (38). The first member (37) includes a core material (31) and a brazing material (32) provided on both surfaces of the core material (31). The first member (37) is press formed. The first member (37) is placed to cover end portions of the blade portions (22).

A plurality of protrusions (33) are provided on a surface of the first member (37) facing the impeller body (20). The plurality of protrusions (33) extend helically along the blade portions (22) of the impeller body (20). The protrusions (33) has end portions where the brazing material (32) is provided.

The second member (38) is formed into a funnel-like shape by press forming. The second member (38) has a hole at its center portion, and the hole has a diameter substantially equal to the outer diameter of a center portion of the first member (37). The second member (38) is placed on a surface of the first member (37) opposite to the surface facing the impeller body (20).

The shroud (30) is held with the center portions of the first member (37) and the second member (38) facing downward. Then, the blade portions (22) of the impeller body (20) are fitted on the protrusions (33) of the shroud (30). Here, the end portions of the blade portions (22) of the impeller body (20) are brought into contact with the brazing material (32) on the end portions of the protrusions (33) of the shroud (30).

After that, the impeller body (20), the first member (37), and the second member (38) are heated in an inert gas so as to melt the brazing material (32), thereby brazing the impeller body (20) and the shroud (30).

Figure 9:
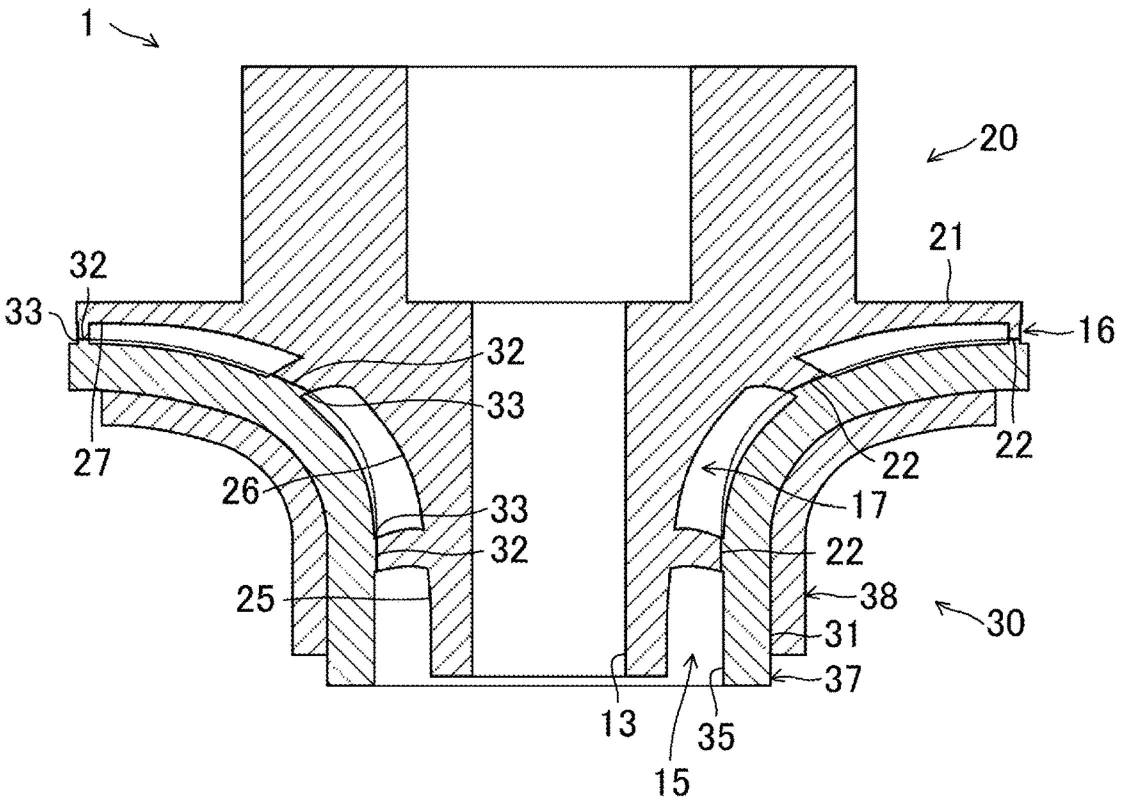
FIG. 9 is a sectional side view of the first member, the second member, and the impeller body fitted together.

As illustrated in FIG. 9, the blade portions (22) of the impeller body (20) and the first member (37) of the shroud (30) are joined to each other via the brazing material (32) provided on the protrusions (33). The first member (37) and the second member (38) are joined to each other via the brazing material (32) provided on the outer surface of the first member (37).

Figure 10:
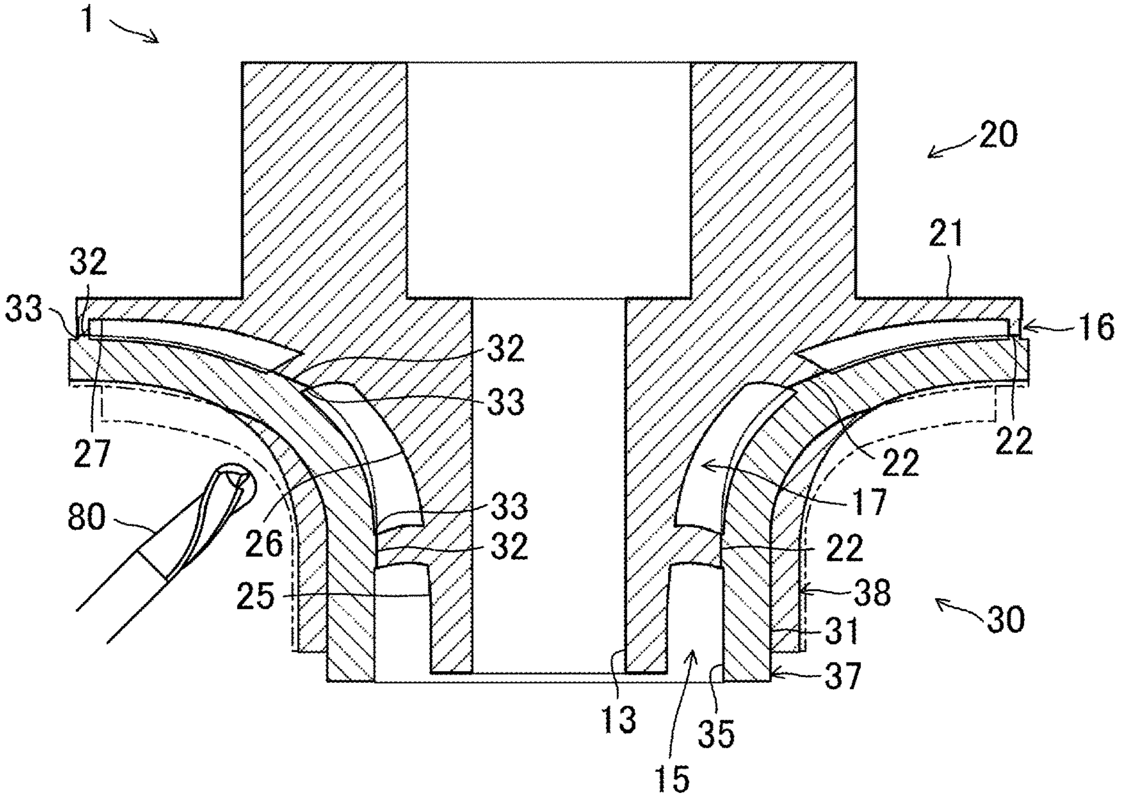
FIG. 10 is a sectional side view of a configuration of the closed impeller after machining.

As illustrated in FIG. 10, a part of the second member (38) is removed by cutting with a ball end mill (80) after the impeller body (20) and the shroud (30) are brazed together.

Specifically, since the shroud (30) is press formed, the thickness of the shroud (30) is restricted to a press-formable thickness. However, in an attempt to employ the closed impeller (1) of this embodiment as a replacement for an impeller of an existing centrifugal compressor, a situation may occur where the outer diameter of the center portion of the shroud (30) does not agree with a dimension of a part (e.g., a seal ring) to be attached to the shroud (30).

To address this situation, in producing the shroud (30) according to this embodiment, the second member (38) is brazed to the first member (37) to increase the thickness, and a part of the second member (38) is removed by cutting, thereby adjusting the outer diameter of the closed impeller (1) to a desired dimension.

The closing impeller (1) is produced in this manner.

Advantages of Second Embodiment

In this embodiment, the shroud (30) includes the first member (37) and the second member (38). The first member (37) is joined to the impeller body (20). The second member (38) is joined to the first member (37) on the opposite side to the side where the impeller body (20) is joined.

This makes it possible to adjust the outer diameter of the closed impeller to a desired dimension according to the thickness of the second member (38).

In this embodiment, the first member (37) includes the brazing material (32) on each of the surface for joining to the impeller body (20) and the surface for joining to the second member (38).

Since the brazing material (32) is provided on both surfaces of the first member (37), it is possible to braze the impeller body (20) and the second member (38) to the first member (37).

In this embodiment, the second member (38) is brazed to the surface of the first member (37) opposite to the surface facing the impeller body (20). After the brazing, the second member (38) is partially removed by cutting.

Thus, in brazing the first member (37) and the second member (38), the brazing material (32) between the first member (37) and the portions of the second member (38) to be removed by cutting can flow to the portions where joining is necessary. This can increase the joining strength.

Other Embodiments

The above-described embodiments may be modified as follows.

In the above embodiment, the shroud (30) having the brazing material (32) on a one-sided surface is formed by press forming a brazing sheet and is brazed to the impeller body (20), but is not limited thereto.

For example, the shroud (30) may be formed by press forming a core material (31) made of an aluminum alloy, and the shroud (30) and the impeller body (20) may be brazed to each other via a brazing material pasted therebetween.

In the present embodiment, the protrusions (33) of the shroud (30) may be machined more than they are designed in the axial direction. Specifically, in brazing the impeller body (20) and the shroud (30), the brazing material (32) on the protrusions (33) of the shroud (30) melts, which may cause a relative movement of the shroud (30) in the axial direction and narrow the gap between the shroud (30) and the impeller body (20). As a result, the channel area of the internal channel (17) may be reduced.

In view of this, in machining the shroud (30), it is preferable to increase a cutting dimension so that the channel area of the internal channel (17) can be ensured, taking it into account that the gap between the impeller body (20) and the shroud (30) is reduced due to the melting of the brazing material (32).

In the present embodiment, the brazing material (32) may include a plurality of layers having different colors so that the state of removal in machining the shroud (30) can be easily determined. Alternatively, the core material (31) of the shroud (30) may include a plurality of layers having different colors.

It will be understood that the embodiments and variations described above can be modified with various changes in form and details without departing from the spirit and scope of the claims. The embodiments and variations described above may be appropriately combined or modified by replacing the elements thereof, as long as the functions of the subject matters of the present disclosure are not impaired. In addition, the expressions of "first," "second," and "third" in the specification and claims are used to distinguish the terms to which these expressions are given, and do not limit the number and order of the terms.

As described above, the present disclosure is useful as a closed impeller and a method for producing a closed impeller.

The invention claimed is:

1. A closed impeller comprising:
an impeller body including a plurality of blade portions; and
a shroud fitted on the impeller body,
the shroud being press formed into a curved shape along end portions of the blade portions,
the shroud including a plurality of protrusions protruding from a surface facing the impeller body and extending, and curved, along the end portions of the plurality of blade portions,
an amount of protrusion of each of the protrusions being less than a thickness of the shroud, and
a brazing material being provided at least between end portions of the protrusions and the blade portions of the impeller body,
the end portions of the protrusions being formed into a shape corresponding to the end portions of the blade portions so that a width of the end portion of each of the protrusions is adjusted to a width of the end portion of an associated one of the blade portions.

2. The closed impeller of claim 1, wherein
the shroud has no brazing material on a surface facing the impeller body, except on the end portions of the protrusions.

3. The closed impeller of claim 1, wherein
the shroud includes a first member joined to the impeller body and a second member joined to a surface of the first member opposite to a surface facing the impeller body.

4. The closed impeller of claim 3, wherein
the first member includes the brazing material between a surface for joining to the impeller body and the blade portions of the impeller body and between a surface for joining to the second member and the second member.

* * * * *